Figure 1:
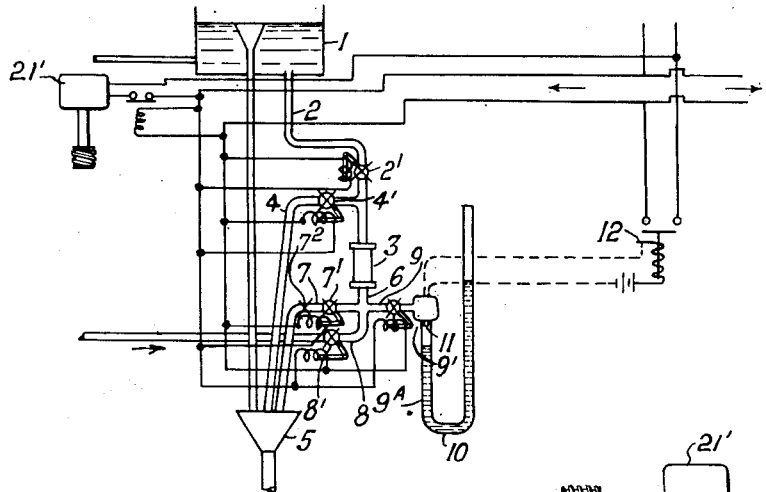

Oct. 23, 1951     P. L. BOUCHER ET AL     2,572,436
MEANS FOR MEASURING AND RECORDING THE FILTRABILITY OF FLUIDS

Filed June 11, 1946     2 SHEETS—SHEET 1

Oct. 23, 1951     P. L. BOUCHER ET AL     2,572,436
MEANS FOR MEASURING AND RECORDING THE FILTRABILITY OF FLUIDS
Filed June 11, 1946     2 SHEETS—SHEET 2

Patented Oct. 23, 1951

2,572,436

UNITED STATES PATENT OFFICE 2,572,436

MEANS FOR MEASURING AND RECORDING THE FILTRABILITY OF FLUIDS

Percival Lionel Boucher, Troon, Ayrshire, Scotland, and Norman Andrew Forster Rowntree, Newcastle-upon-Tyne, England, assignors to Glenfield and Kennedy Limited, Kilmarnock, Ayrshire, Scotland, a corporation of Great Britain and Northern Ireland Application June 11, 1946, Serial No. 676,084
In Great Britain April 12, 1945

7 Claims. (Cl. 73—53)

This invention consists in means for measuring and recording the filtrability or the filtrability index of fluids.

One of the applicants, Percival Lionel Boucher, has enunciated and proved a theory in connection with the filtrability of fluids for which reference should be made to a thesis "Straining of Water and Effluents" approved in 1944 by the University of London for the degree of Ph. D. in the Faculty of Engineering, setting out the physical laws governing the motion of fluids undergoing filtration, and it is the object of the present invention to provide apparatus employing the principles of this or other valid theory to measure and/or to record automatically the property of fluids defined in the above theory and herein as "filtrability."

The filtrability of a fluid is a methematical function of the rate of increase of the loss of head with respect to the volume filtered at constant rate of flow or in given variable conditions of rate of flow; or of the rate of decrease of flow with respect to the volume filtered at constant head loss or in given variable conditions of loss of head. The filtrability index of a fluid is the reciprocal of the filtrability of that fluid.

The theory of filtration involving the conception of filtrability is dependent upon a number of factors, e. g., A filter (or strainer) the area of which is A
The rate of flow through the filter, Q
The initial resistance to flow of the clean filter or the difference in pressure head between the input and the output of the filter when the flow begins, $H_1$
The resistance to flow or the difference in pressure head between the input and output of the filter after the passage of volume V of the fluid flowing through the filter $H_2$ If, now, the filtrability index is expressed by the symbol "I", and the filtrability is expressed by the symbol "F", using the above nomenclature, the theory referred to can be expressed by the differential equation $$dH/dV = IH \text{ and } F = 1/I$$

This equation expresses a growth law, commonly referred to as the "compound interest" law, which it has been established by one of the applicants, yields the following expression connecting the factors quoted above $$H_2 = mHQ_1/A \cdot e^{nIV/A}$$

where "m" and "n" are integration constants.

The above equation refers to a condition in which Q is maintained constant. If Q varies, becoming less as the filter clogs up, the inlet head, say, being constant, but the outlet head diminishing with the increasing resistance of the filter, the equation refers to the state of affairs during any interval of time $dT$ during the filter's cycle, and the value of $H_2$ at any time would be determined by methods of integration, and the value of I calculated therefrom. In the embodiment disclosed, the relationship between I and $H_2$ is most conveniently established by graphical methods or by calibration of the apparatus using fluids having known values of I, determined in an apparatus in which Q is maintained constant. A given value of $H_2$, which must lie within the range of the apparatus, is always reached, the time T within which this value is reached varying according to the filtrability index of the fluid, T being the shorter the higher the value of I.

In a given filter, "Q" may be maintained constant by adjustment of the loss of head across the filter and if "A" remains constant, "I" may then be written $$I = \frac{1}{V} \cdot \log_e \frac{(H_2)}{(H_1)}$$

and, by definition, "I" and "F" may have numerical values dependent upon the units adopted. It is these numerical values or other numerical values arising from any other valid theory of filtrability that it is proposed to measure and/or to record automatically by this invention.

The factors of measurement by which filtrability or filtrability index can be determined are:

(1) Time to reach given head loss at constant flow.
(2) Time to reach given head loss at changing flow.
(3) Rate of change of flow in given head loss conditions.
(4) Rate of change of head loss in given flow conditions.
(5) Rate of flow after given time
(6) Head loss after given time.
(7) Quantity, volume or weight discharged in a given time.
(8) Quantity discharged to reach a given head loss.

Some of the fluid to be examined is passed through a filtering medium, and one of the above factors, such as the increase in the fluid resistance of the filtering medium is measured, and translated or recorded, while the filtering medium is cleaned after the passage therethrough of the said fluid.

For obtaining intermittent indications, the portion of the fluid to be examined is passed through the filtering medium for a period of time depending on the rate of increase in fluid resistance of the filtering medium, and at the end of the said period is cut off, and cleaning fluid passed through the filtering medium until the latter is restored to its original state of fluid resistance, when a further quantity of the fluid to be examined is passed through the filtering medium, and the above steps repeated.

For obtaining a continuous indication, a portion of the fluid stream to be examined is by-passed through a moving filter medium, part of which is immersed in the said stream portion, and the other part subjected to continuous cleaning, the resistance to flow through the filtering medium being measured by the difference of pressure at the inlet and the outlet sides of the moving filtering medium.

Numerically, the value of "I" for a fluid which is incapable of causing blockage would be zero, whilst fluids containing matter capable of causing blockage of the filter would give a positive value of "I" which would be the greater, the larger the amount of such matter per unit volume of the fluid.

Apparatus for measuring, recording, indicating and/or utilising a variable difference between two liquid pressure heads and particularly applicable to indicating the loss of head of liquid in passing through a liquid filter due to the resistance of the filtering medium has been previously proposed. It has also been proposed to employ two vertical tubes connected to the water above the filter and to the outlet respectively and having floats therein attached to cords passing over adjacent pulleys connected with a conveniently arranged differential gear so as to give a direct reading of the difference in the relative positions of the floats and therefore of the water levels in each tube.

The invention consists in measuring and recording the filtrability of a fluid comprising a filtering unit, means for measuring and recording the filtrability or the filtrability index (as herein defined) of the fluid and means for cleaning the filtering unit by passing cleaning fluid through the filtering unit.

Where recording of the pressure difference indications are required, the apparatus includes means for transmitting such indications in terms of filtrability or of the filtrability index in accordance with the above or other valid theory, and preferably means for adjusting the readings in accordance with temperature or mechanical variations. An embodiment of such apparatus is more particularly described in the specification.

For intermittent operation, the filter unit is static, and means are provided for causing the cleaning fluid to pass therethrough in a reverse direction to that taken by the fluid to be examined, after the flow of the latter fluid through the filtering medium.

For continuous operation, the filter unit comprises a filter element adapted for continuous movement of one portion thereof through a stream of the fluid to be examined, and of another portion thereof through a stream of cleaning fluid so that the said filter element as it passes into the fluid to be examined has its initial or minimum fluid resistance $(H_1)$.

As fluctuations in the temperature of the fluid being examined will effect the viscosity of the fluid and therefore the pressure loss and the rate at which the pressure loss across the filter unit changes (other things being equal), it is desirable to incorporate means for temperature correction or control. This may be effected by a resistance pyrometer, or by a bimetallic strip which is adapted to adjust automatically the contact point in the manometer unit in a compensating manner.

Alternatively, temperature control may be employed in some instances to raise or lower the temperature of the fluid being examined as may be necessary to maintain a constant temperature during its passage through the apparatus.

In cases where the fluid temperature is not liable to extensive or to rapid fluctuations, it may be adequate to provide hand adjustment of the manometer contact in lieu of automatic control.

It is important to ensure that successive cycles of operation of the apparatus be carried out under similar rate of flow conditions, such as by supplying the fluid to be examined from a constant head tank. Alternatively, an automatic flow control valve may be employed. In the case of the said constant head tank, for use in water filtration plants, the tank may take the form of an inspection vessel in which the clarity of the water is normally judged by visual inspection.

The filtering material in the filtering unit may be sintered glass or metal, woven wire or other material, graded fine sand or other similar substance of sufficient fineness and porosity to suit the fluid to be tested and the foreign matter in the fluid to be arrested by the filtering material.

The instrument herein described, modified to suit the particular circumstances, is applicable to the measurement of filtrability and of concentration of foreign matter in fluids, in many different situations, of which the following are examples.

1. Water and Effluents.

(a) Raw waters and effluents for potable and industrial uses where it is desired to study their suitability and their qualities in relation to chemical treatment and physical purification.

(b) Raw waters and effluents where it is desired to measure the rate of blockage of filters or strainers for purposes of plant design.

(c) Raw waters and effluents as described under (a) and (b) above, but for purposes of control of plant operation according to value "I".

(d) Purified or treated waters and effluents in order to determine the efficiency of the treatment or in order to obtain an absolute measure of clarity.

2. Liquids other than water in relation to problems of treatment, purification, clarification and absolute clarity.

(e) River and canal waters where it is required to study silt problems.

(f) Oils.

(g) Sugar syrups and solution.

(h) Wines, spirits and beers.

(i) Other liquids and solutions of industrial or technical importance.

3. Cases where it is desired to measure dust or other impurities capable of extraction.

(j) Air, as in air conditioning plant.

(k) Air as in collieries and in other mines.

(l) Air as in applications of air conditioning in industrial processes: e. g., manufacture of photographic materials.

(m) Air as in the study of atmospheric pollution.

(n) Flue gases as in the study of smoke abatement.

(o) Other gases where the study of suspended solids is desired.

4. Fluids, where it is required to effect remote control of plant by means of variation of filtrability factors.

Figure 2:
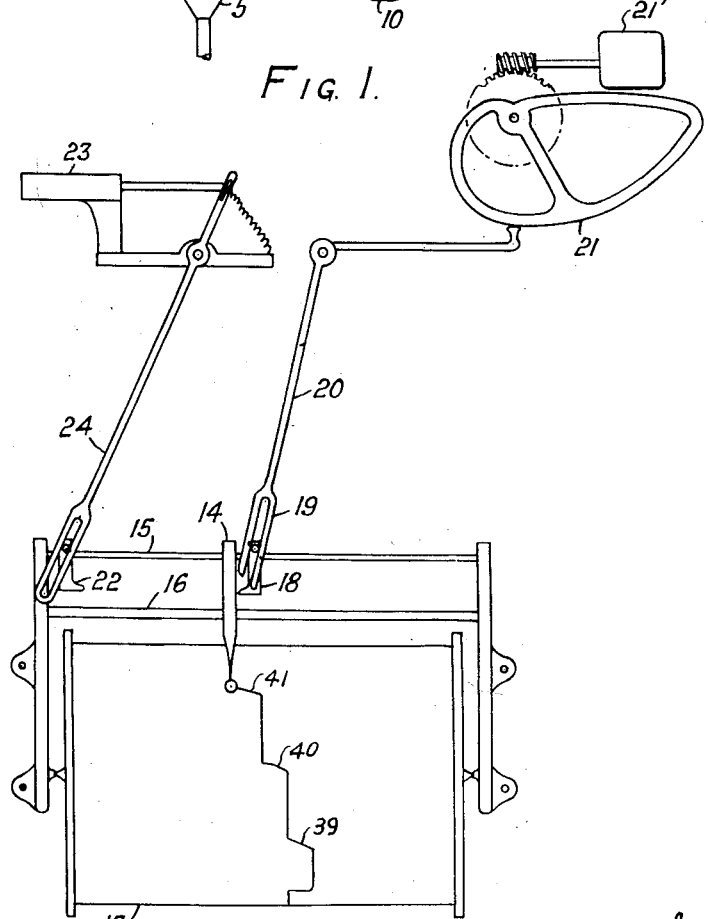
Figure 3:
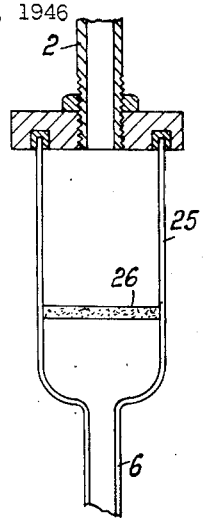
Figure 4:
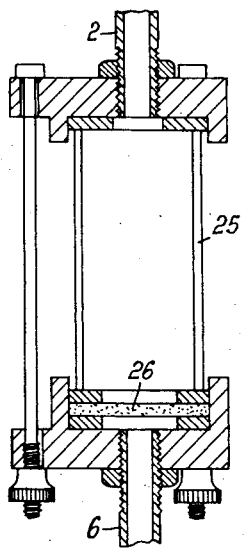
Figure 5:
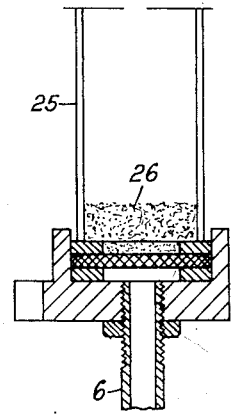

A practical embodiment of the invention is illustrated in the accompanying drawings in which Fig. 1 is a diagram showing the general layout of apparatus, for intermittently measuring and recording the filtrability of a fluid. Fig. 2 is a semi-diagrammatic view of the recorder mechanism, and Figs. 3, 4 and 5 are filtering units for use in apparatus for intermittent recording of the filtrability of a fluid.

In the drawings 1 denotes a constant head tank, 2 denotes a pipe connecting the tank 1 with a filtering unit 3, 2' denotes a control valve in the pipe 2. A branch 4 from the pipe 2 between the valve 2' and the filtering unit 3 leads to a drain 5 through a control valve 4'. An outlet pipe 6 from the filtering unit 3 divides into three branches 7, 8 and 9, control valves 7', 8' and 9' being provided, one in each of the branches 7, 8 and 9, respectively. The branch 7 leads by way of a flow regulating valve 7² to the drain 5; the branch 8 is connected to a source of cleaning fluid; and the branch 9 is connected to a leg 9A of a manometer 10. Contacts 11 in the manometer 10 are adapted to be electrically connected together when the fluid pressure in the branch 9 drops to a predetermined value. The contacts 11 are in circuit with a relay 12 adapted to energise solenoids which operate the valves 2', 4', 7', 8', 9', and to operate the recording mechanism. The valves are interconnected, so that, when the valves 2', 7' and 9' are opened, the valves 4' and 8' are closed and vice versa.

The recorder mechanism includes in the particular instance a chart-carrying recording drum 13 rotatable at a predetermined speed and a recording pen 14 slidably mounted on rails 15 and 16, the pen point being arranged to bear on a chart carried by the drum 13. The recording pen 14 is arranged to be moved along the rails 15 and 16 in one direction by an abutment 18 slidably mounted on the rail 15 and entrained by the forked end 19 of a bell-crank lever 20, which is adapted to be given rotational movement by a cam 21, which is so contoured that a certain distance moved by the abutment over any part of the surface of the drum 13 is equivalent to a particular value of filtrability of fluid. The cam is so contoured that, when dealing with fluids having different filtrability values, the different lengths of time during which it may rotate until the respective predetermined filter resistance $H_2$ for a particular fluid is reached, cause displacements of the pen across the chart—when abutments 18 and 22 are both in contact with the pen 14—corresponding to the value of the filtrability of the fluid. Because of the mathematical difficulty of expressing the value of F in accordance with the theory stated above for a filter operating with a constant inlet head, a diminishing outlet head, and a diminishing rate of flow, the contour of the cam is preferably determined by calibration as previously described, using fluids of known filtrability, and setting off angular coordinates of the cam such that the pen would be brought to its correct position on the chart for each angular position of the cam and thus for the filtrability measured in each cycle of operation of the instrument. The contour of the cam depends, however, upon the formula quoted above, from which for Q constant, I varies 1/T, and for Q variable the formula above would be integrated between the limits of flow.

The speed of rotation of the cam is determined by the maximum value of filtrability to be measured and thus by the maximum time to be taken for the head $H_2$ to be recorded.

It is to be understood that, in lieu of a drum chart, a disc chart or a strip chart may be employed.

Cam 21 is driven by a constant speed motor 21' whose operation is controlled by the operation of solenoid 12. During the time when solenoid 12 is not operated, the motor circuit is closed and the motor rotates at constant speed, but when solenoid 12 is operated by a closure of contacts 11, the motor circuit is opened and rotation of the motor stopped.

An abutment 22 slidably mounted on the rail 15 is adapted to come against the side of the recording pen 14 remote from the abutment 18 when the abutment 22 is urged towards the recording pen 14 by a solenoid 23 acting on the abutment 22 through a lever 24.

Preferred forms of the filtering unit 3 are illustrated in Figs. 3, 4 and 5 and comprise a cylindrical vessel 25, preferably of a transparent substance, and containing a disc or bed 26 of filtering material. The pipe 2 enters at the top and the pipe 6 conducts the filtered fluid away.

In operation, considering the mechanism illustrated in Figs. 1 and 2, and assuming that the filtering material has been cleaned so that the fluid resistance is at its minimum value, the valves 2', 7' and 9' are opened and the valves 4' and 8' are closed and the motor driving the recording mechanism is started.

Fluid from the tank 1 flows down the pipe 2, through the valve 2' and into the filter 3 through which it passes by way of the pipe 6, the branch 7, and the valve 7' to the drain 5. As the filter is clean, its resistance to the passage of fluid is at a minimum value and the pressure in the leg 9A of the manometer 10, connected by the pipe 9 and the open valve 9' to the discharge end of the filter, is at its maximum value. As the filter gradually becomes choked the pressure at the discharge end of the filter decreases, and the liquid in the leg 9A of the manometer 10 rises.

While fluid is passing through the filtering unit 3, the cam 21 is rotating and causing rotation of the bellcrank lever which moves the abutment 18 along the guide rail 15, entraining the recording pen 14 and drawing a time line across the drum 13 which is rotating.

When the pressure at the discharge end of the filtering unit 3 has dropped to a predetermined value, the liquid in the leg 9A of the manometer 10 causes the contacts 11 to be put in electrical connection with one another, thereby energising the relay 12, which operates mechanism which stops the motor 21' rotating the cam 21 by opening the motor circuit, energises the solenoid 23, closes the valves 2', 7', 9' and opens the valves 4' and 8'. When the solenoid 23 is energised, it actuates the lever 24 which moves the abutment 22 along the rail 15 until the said abutment 22 comes against the recording pen 14 which is no longer being moved across the drum since the cam 21 is not now rotating. The two abutments 18 and 22 thus hold the recording pen 14 between them and cause it to trace a circumferential line on the chart on the drum 13, the distance from zero pen position of the time line up to the point where it merges into a circumferential line being a measure of the filtrability of the fluid being examined. Closing of the valves 2', 7' and 9' shuts off from the filtering unit 3 the supply of fluid to be examined, isolates the manometer 10 and shuts off the discharge end of the filtering unit 3 from the drain 5. Opening of the valves 4' and 8' allows cleaning fluid to flow through the filtering unit 3 in reverse direction, the soiled cleaning fluid being discharged to the drain through the pipe 6.

The period during which cleaning fluid flows may be controlled by mechanism operated by the motor driving the recording drum 13, closure of the relay circuit bringing the mechanism into operation, the same motor being adapted to operate mechanism to reset the valves to begin a fresh cycle of operations.

After the filtering unit has been cleaned by running the cleansing fluid therethrough, the mechanism may be again started to give a new test of the same material or of different material supplied to the constant head tank 1. Successive tests are shown at 39, 40 and 41, respectively, on the chart, the distance between peripheral lines on the chart being a measure of the time T which it takes the pressure difference between the input and the output of the filtering unit 3 to reach the predetermined value for the fluid being measured. The time T is a measure of the filtrability index of the fluid being measured, so that the filtrability index for each fluid measured may be determined by the distance between the peripheral lines on the chart.

What is claimed is:

1. Apparatus for measuring and recording the filtrability of a fluid comprising a filtering element of filtering material through which the fluid to be measured is passed, recording means including a scriber movable over a chart, an electric motor operatively connected to actuate said scriber, an electrical circuit including said motor, and means subject to the pressure of the fluid at the discharge side of the filtering unit and operable when the pressure at said side of the filtering unit has dropped to a predetermined value for causing said electrical circuit to be opened.

2. Apparatus for measuring and recording the filtrability of a fluid as set forth in claim 1 in which the electrical circuit includes a relay for opening and closing the same, and in which said relay is controlled by an electric switch which is closed when the pressure at the discharge side of the filtering unit has dropped to a predetermined value.

3. Apparatus for measuring and recording the filtrability of a fluid as set forth in claim 1 including a manometer having one leg thereof placeable in fluid communication with the discharge side of the filtering unit, and in which the electrical circuit is controlled by a switch which is actuated when the pressure in said leg of the manometer reaches a predetermined low value.

4. Apparatus for measuring and recording the filtrability of a fluid as set forth in claim 1 in which the recording means includes chart-carrying means with a chart movable at a predetermined speed, a movable recording pen for drawing a trace on the chart, and a cam rotatable by the electric motor at a constant speed and operatively connected to the pen to cause movement thereof relative to the chart.

5. Apparatus for measuring and recording the filtrability of a fluid as set forth in claim 4 which also includes a movable abutment movable on opening of the electrical circuit to a position to locate the pen with respect to the chart.

6. Apparatus for measuring and recording the filtrability of a fluid as set forth in claim 1 including a valve for controlling the supply of fluid to the filtering unit, and means responsive to a predetermined low pressure on the discharge side of the filtering unit for actuating said valve for cutting off from the filtering unit the supply of fluid the filtrability of which is to be measured and recorded.

7. Apparatus for measuring and recording the filtrability of a fluid as set forth in claim 6 which also includes a conduit for supplying cleaning fluid to the filtering unit, a valve for controlling the supply of cleaning fluid through said conduit, and means for opening said valve when the pressure at the discharge side of the filtering unit reaches the predetermined low value at which the valve for controlling the supply of the fluid to be filtered is actuated to cut off the supply of such fluid to the filtering unit.

PERCIVAL LIONEL BOUCHER.
NORMAN ANDREW FORSTER ROWNTREE.

REFERENCES CITED

The following references are of record in the file of this patent:

UNITED STATES PATENTS

| Number | Name | Date |
|---|---|---|
| 1,883,805 | Martin et al. | Oct. 18, 1932 |
| 2,068,476 | Thomas | Jan. 19, 1937 |
| 2,379,835 | Sisler | July 3, 1945 |
| 2,390,252 | Hayward | Dec. 4, 1945 |

FOREIGN PATENTS

| Number | Country | Date |
|---|---|---|
| 1,838,614 | France | Dec. 29, 1931 |